(No Model.)
H. E. DAVIS.
MITER BOX.
No. 415,940. Patented Nov. 26, 1889.
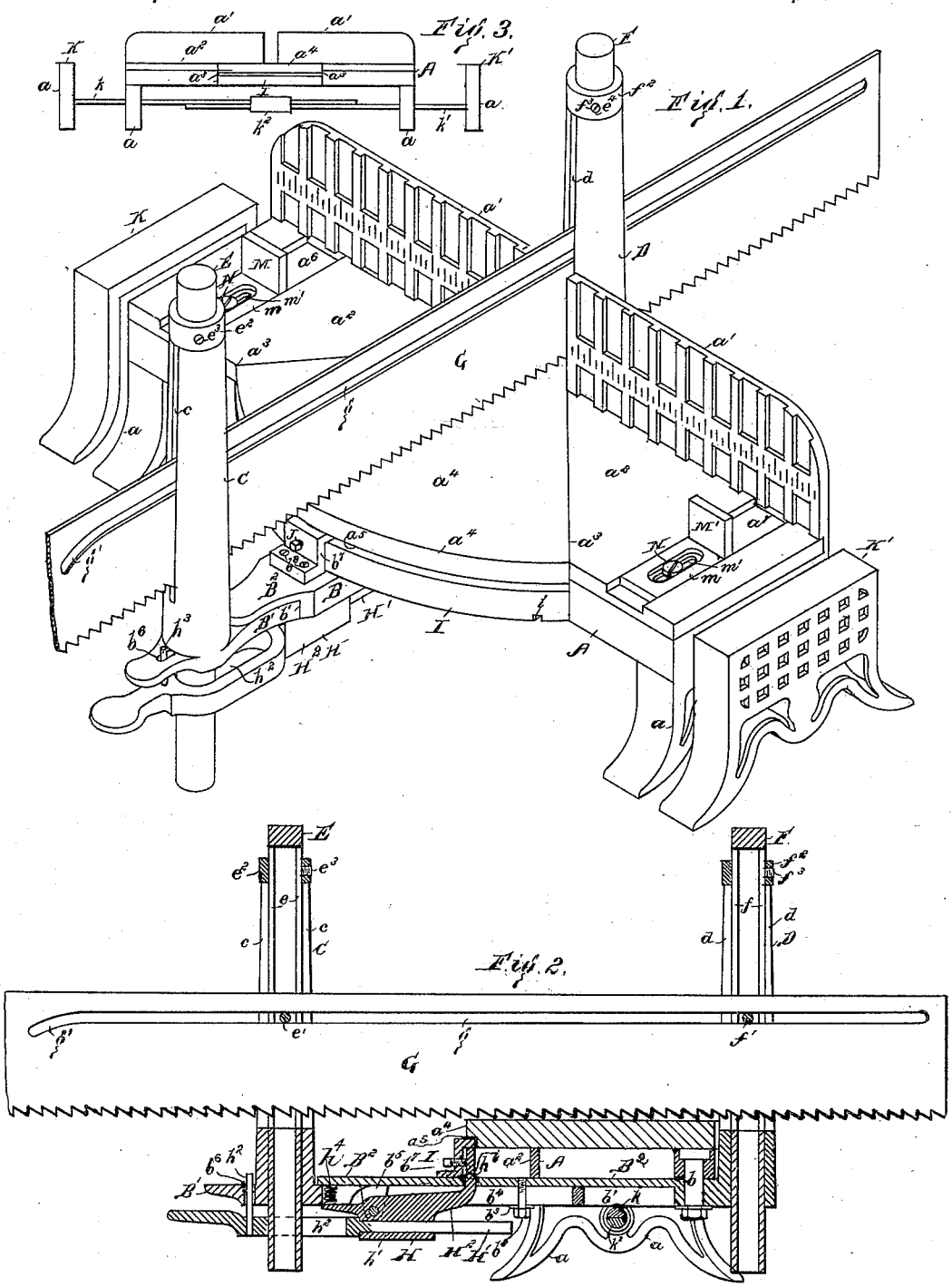
Witnesses
Kirkley Hyde.
Wyntie C. Beals.
Inventor
Hezron E. Davis,
By Albert M. Moore,
His Attorney.

UNITED STATES PATENT OFFICE.

HEZRON E. DAVIS, OF LOWELL, MASSACHUSETTS.

MITER-BOX.

SPECIFICATION forming part of Letters Patent No. 415,940, dated November 26, 1889.

Application filed May 28, 1888. Serial No. 275,311. (No model.)

*To all whom it may concern:*

Be it known that I, HEZRON E. DAVIS, a subject of Victoria, Queen of the United Kingdom of Great Britain and Ireland, residing at Lowell, in the county of Middlesex and Commonwealth of Massachusetts, have invented a certain new and useful Improvement in Miter-Boxes, of which the following is a specification.

My invention relates to miter-boxes and connected devices, and has for its object to enable the box to be used upon stock of greater thickness and length and to enable a perfect miter to be cut upon molding and other irregular shapes.

In the accompanying drawings, Figure 1 is an isometric view of my improved miter-box and saw; Fig. 2, a central vertical section of the same at right angles to the back of the same and through the saw-guides, and Fig. 3 a front elevation of the frame and the false legs.

The frame A, provided with legs $a$, back $a'$, and bed $a^2$, is of the usual construction and operation. The back $a'$ is ribbed to make it lighter and to lessen the work of planing or otherwise surfacing it. The middle of the bed $a^2$ is cut away at $a^3$ in the usual manner; but the space $a^3$ is filled by a sector $a^4$, of wood, the top of which is flush with the top of the bed $a^2$ and forms in effect a part of the bed. The piece $a^4$ might be made in one with the remainder of the bed; but, being the part most exposed to injury, it is thought better to make it in a separate removable piece, and the top of this piece is not covered with sand or emery, as the rest of the bed is, to avoid any possibility of the teeth of the saw being dulled by coming in contact with it.

The swinging guide-lever B turns on a vertical pivot-bolt $b$, the axis of which lies in the plane of the front surface of the back $a'$ in the usual manner, and to this guide-lever are secured two vertical sleeves C D, both of which are provided with vertical slots $c\ d$, also in the usual manner, except as hereinafter stated. Within the sleeves C D are arranged cylindrical saw-guides E F, loosely fitting the sleeves C D and vertically slotted at $e f$ to admit the saw G. The saw G is not provided with a thickened back in the customary manner, but is provided with a slot $g$, which is straight for nearly its entire length and nearly parallel with the plane of the points of the saw-teeth, but rises about an eighth of an inch in the direction from the handle toward the end of the saw, and the end of the slot $g$ nearest the handle of the saw is curved downward, as shown at $g'$, having a fall of about an eighth of an inch, and the length of the curved or downwardly-inclined slot being about an inch in length. Through the slot $g$ are driven horizontal pins $e'\ f'$, which pass through the saw-guides E F, respectively, said pins being removable from the guides in any convenient way, preferably by making the pins in the form of screws to enter correspondingly-threaded holes in the saw-guides, in order that the saw may be removed from the guides when it becomes necessary to file the saw. The inclination of the slot $g$ and the downward curvature of said slot at $g'$ cause the saw to be raised when it is pushed inward to its greatest extent, and the guides E F are prevented from descending. While the saw is working through the stock the saw supports the guides; but when the farther descent of said guides is prevented (by the stop-collars hereinafter described striking the tops of the sleeves C D) the saw rides on the pins $e'\ f'$, so that in the ordinary operation of the saw the saw does not rise when pushed inward, but only when the cut is completed, the guides, while the cut is being made, rising and falling the slight amount rendered necessary by the inclination of the slot. It is obvious that the inclination of the body or main portion of the slot $g$ may be sufficient to raise the saw enough to clear the bed; but it is thought preferable to use the downward curvature $g'$ above described and make such inclination less than would otherwise be required.

The distance to which the saw-guides E F may descend in the sleeves C D is limited by adjustable stop-collars $e^2\ f^2$, surrounding said guides above said sleeves and held in place by set-screws $e^3\ f^3$, which turn radially in said collars and thrust against said guides. The stop-collars are so adjusted on the guides as to allow the saw barely to pass through the stock when the collars rest upon the tops of the sleeves C D, and as the depth of the saw is diminished by filing the top collars are readjusted for this purpose.

When the saw is to be changed from one angle to another, it is pushed in as far as possible, and is lifted by the inclination of the slot $g$ and the curvature $g'$, above described, high enough to allow the teeth of the saw to swing clear of the bed. The guide-lever B is adjustable in length to enable the space between the sleeve C and the back $a'$ to be enlarged to admit stock of a width greater than usual, said lever being formed in two parts B' B², the part B' sliding in a longitudinal slot $b'$ in the main or pivoted part B², and the parts after adjustment being held from movement on each other by a holding-screw $b^2$, which passes up through a washer $b^3$ and through a slot $b^4$, narrower than said washer, formed in the sliding part B', into a threaded hole in the main part B². The angular position of the guide is maintained by a dog-lever H, the dog $h$ of which enters one of the notches $i$ in the under side of the arc I, there being several such notches arranged to hold the saw in the different positions most commonly required. The dog-lever H is formed in two parts H' H², the main part H² of which is pivoted between ears $b^5$, which project downward from the main part B² of the guide-lever within the slots $b^4$, (in the movable part B' of the guide-lever,) and below its pivot is provided with a longitudinal perforation $h'$ in which slides the part H' of said dog-lever when the guide-lever is extended, the sliding parts of said lever being caused to move together by a pin $h^3$, which projects upward from the part H' and through a hole $b^6$ in the part B'. The dog $h$ is caused to engage the notches $i$ by a spring $h^4$, compressed between the stationary part B² of the guide-lever and the front end of the stationary part H² of the dog-lever within said slot $b^4$. The sliding part H' of the dog-lever is provided with a slot $h^2$, which loosely surrounds the saw-guide E and allows the free end of the said dog-lever to be raised to release the dog $h$ from the notches $i$ by grasping the free ends of the dog-lever and guide-lever between the thumb and finger.

The sector $a^4$ is rabbeted at its lower curved edge at $a^5$, and just below said edge is arranged the arc I, which is preferably cast in one piece with the frame A. The upper and lower faces of the arc I are planed parallel with each other, and the guide-lever is held against the under surface thereof by a clip $b^7$, secured by screws $b^8$ to the top of the main part of said guide-lever and reaching over and resting upon the top of said arc. The guide-lever is thus firmly held in a horizontal position, or, rather, parallel with the bed, at all times, and the perpendicularity of the guide to the plane of the bed is thus insured. A set-screw J turns in a threaded hole in the clip and thrusts radially against the curved face of the sector $a^4$ and enables the saw to be held at any angle, however unusual.

In order that longer stock may be successfully operated upon without tipping the miter-box, and to avoid for that purpose greatly increasing the length and therefore the weight and cost of the box, I provide two false legs K K', each of which is of the same height and preferably as wide as or wider than the true legs $a\ a$, or ends of the frame. To the inner face of each false leg K K', I attach a rod $k\ k'$, preferably half-round in cross-section, one rod $k$ having its under surface flat and the other rod $k'$ having its upper surface flat, and these flat surfaces being in contact when the false legs are closed up against the true legs $a\ a$ or ends of the frame, and a sleeve $k^2$ surrounds both rods and is secured to one of them to hold the rods in contact, while each rod is free to slide on the other. Each rod $k\ k'$ slides in a correspondingly-shaped hole in one of the true legs and reaches to the true leg at the other end of the frame. By drawing out either false leg the ability of the frame to support long stock without tipping is increased nearly threefold—that is, nearly the whole length of the frame is added to the half which supports the stock.

Moldings are frequently made with two flat bearing-surfaces at right angles to each other, but not continued until the surfaces intersect, and it is difficult to cut an exact angle on such molding, especially where the molding is very wide and the bearing-surfaces are narrow. To enable such angles to be cut readily with great exactness, I attach to the bed adjustably two molding-gages M M', each of these gages consisting of an angle-piece of metal, one part of which $m$ is arranged horizontally in a groove $a^6\ a^7$, formed in the top of the bed $a^2$, at right angles to the back $a'$, and is held at any desired distance from said back by a set-screw N, which passes down into the bed $a^2$ through a slot $m'$, with which each gage is provided. Each gage is provided with a face parallel with the back of the miter-box, so that when the gages are set at the proper distance from the back of the miter-box, so as to bear against an edge of a strip of molding arranged between the gages and said back, with the flat bearing-surfaces of the molding against the bed and back of the miter-box, any desired angle may be cut in the molding, and other pieces of the same molding may be quickly arranged in position to be cut to the same or other angles, as may be desired, without any special care on the part of the operator, except to arrange the molding between the gages and the back and in contact with both gages and said back.

It will be seen that the sector $a^4$ and the arc I extend in front of the miter-box for a considerable distance, and thus afford a broader bearing for the stock to be operated upon; also, that the great distance of the arc I from the pivot of the guide-lever enables the guide-lever to be held in position more firmly, and that the curved surface of the arc being exposed enables the set-screw J to be more readily operated. Arcs for similar purposes are commonly very inconveniently arranged below the bed of the miter-box.

It will be seen that the saw above described will operate upon stock of any thickness, cutting entirely through the same, the only limitation being the length of the saw-guides and their sleeves, whereas the back of the back-saw commonly employed in miter-boxes prevents the saw from cutting entirely through stock of a thickness equal to or greater than the depth of the saw.

The stop-collars may be so adjusted as to prevent the saw from cutting entirely through the stock, if desired, as in making a tenon.

To make the saw above described stiff enough, it should be made one or two numbers greater in thickness than the blade of a back-saw of the same size.

I claim as my invention—

1. The combination of the vertical slotted saw-guides, the saw arranged in the slots of said guides and provided with a longitudinal slot arranged nearly parallel with the teeth of said saw, but rising slightly toward the end of said saw, and guide-pins passing through the slots in said guides and through the slot in said saw, as and for the purpose specified.

2. The combination of the vertical slotted saw-guides, the saw arranged in the slots of said guides and provided with a longitudinal slot arranged nearly parallel with the teeth of said saw, but rising slightly toward the end of said saw and inclined downward for a short distance at its lower end below the general direction of said slot, and the guide-pins passing through the slots in said guides and through the slot in said saw, as and for the purpose specified.

In witness whereof I have signed this specification, in the presence of two attesting witnesses, this 25th day of May, A. D. 1888.

HEZRON E. DAVIS.

Witnesses:
ALBERT M. MOORE,
KIRKLEY HYDE.